United States Patent
Cittadini et al.

(12)

(10) Patent No.: US 6,258,307 B1
(45) Date of Patent: Jul. 10, 2001

(54) PROCESS FOR PREPARING A MOULDING ELEMENT FOR MOTORCAR BODIES

(75) Inventors: Paolo Cittadini, Luvinate; Pier Paolo Ferrante, Cuvio; Ralf Laudwein, Bardello, all of (IT)

(73) Assignee: Industrie Ilpea S.p.A. (IT)

( * ) Notice: Subject to any disclaimer, the term of this patent is extended or adjusted under 35 U.S.C. 154(b) by 0 days.

(21) Appl. No.: 09/607,025

(22) Filed: Jun. 29, 2000

Related U.S. Application Data

(62) Division of application No. 09/099,969, filed on Jun. 19, 1998, now Pat. No. 6,136,407.

(30) Foreign Application Priority Data

Jun. 25, 1997 (EP) .................................................. 97830302

(51) Int. Cl.[7] .............................. B32B 3/06; B32B 31/30; B60R 13/04

(52) U.S. Cl. ........................ 264/177.1; 428/99; 428/122

(58) Field of Search ...................... 428/99, 122; 24/289, 24/297; 293/128; 264/177.1

(56) References Cited

U.S. PATENT DOCUMENTS 6,136,407 * 10/2000 Cittadini et al. ....................... 428/99

* cited by examiner

Primary Examiner—Alexander S. Thomas
(74) Attorney, Agent, or Firm—Robert F. I. Conte; Lee, Mann, Smith, McWilliams, Sweeney & Ohlson

(57) ABSTRACT

A process for preparing a molding element for car bodies comprising the steps of: manufacturing a main body (2) of elongated conformation and manufacturing a continuous support element (7) carrying attachment projections (9) which are then connected with the main body (2) for engaging a corresponding anchoring region (5a) formed on a car body (5); the attachment projections (9) are rigidly in engagement with the continuous support element (7) which is fitted by sliding in a longitudinal housing (10) formed in the main body (2) and then axially fixed to this latter.

21 Claims, 2 Drawing Sheets

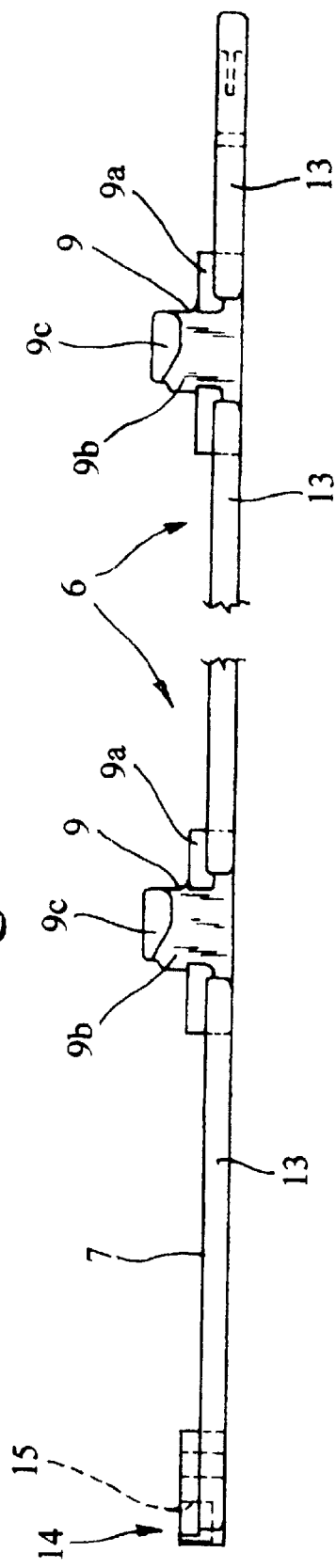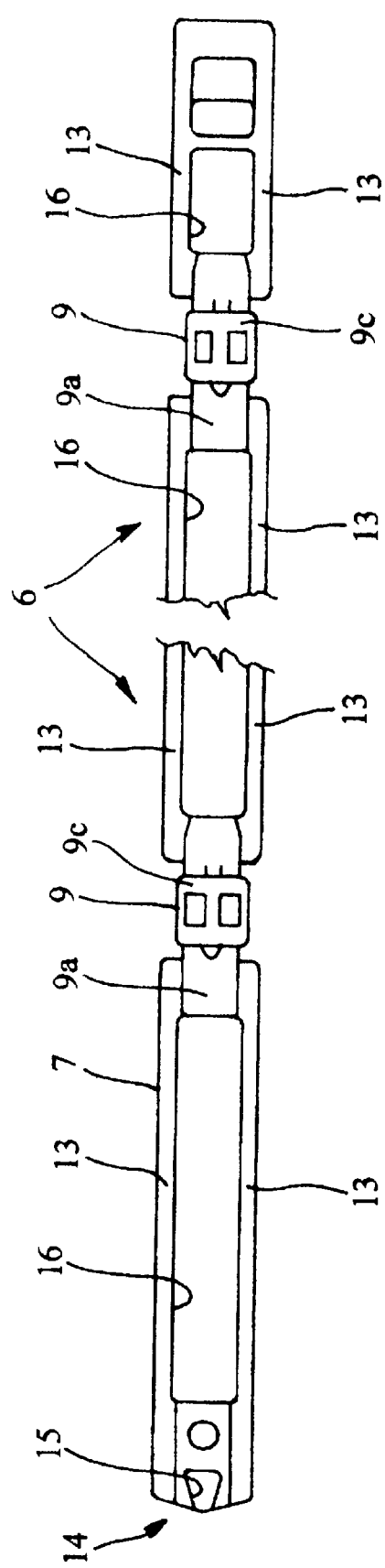

PROCESS FOR PREPARING A MOULDING ELEMENT FOR MOTORCAR BODIES

This is a divisional of our application Ser. No. 09/099,969 filed Jun. 19, 1998 U.S. Pat. No. 6,136,407.

BACKGROUND OF THE INVENTION

The present invention relates to a process for preparing a molding element for motorcar bodies.

In particular, the molding element in reference is intended for being applied as finish and/or protection to motorcar bodies and more specifically to parts thereof such as doors, bumpers, edge areas at the lower perimeter of the car body, and so on.

It is known that molding elements for uses as briefly described above are traditionally comprised of a strip, typically of plastic material, which is provided with appropriate attachment means for association with the intended body portion.

In particular, presently there are different typologies of molding elements depending on the different attachment systems used for anchoring to the car body.

In a first known typology of molding elements, the strip of plastic material is anchored by use of adhesives and more specifically double-sided adhesive tapes interposed between the car body and one side of the molding element.

Drawbacks of this type of anchoring are well apparent: precariousness in connection, unreliability in time, great responsiveness to weathering and dynamic stresses.

In a second type of known typology, the attachment means consists of nails or studs fastened, by welding for example, to the car body and suitably covered with plastic material so that they can be fitted, by snap or interference fit, into corresponding housings formed in a coupling face of the molding element.

Surely, this second type of known typology is more reliable than the previously described one. However, it is to note that, due to the fact that a plurality of nails or studs are to be made and connected to the car body, a great complication in terms of construction is involved and necessarily lack of precision may occur in working which, in conclusion, will bring about high production costs and often poor quality of the product. More precisely, possible lack of precision in the size and/or placement of the attachment nails or studs gives rise to an inappropriate fastening of the strip or molding element and consequent deformation of same, which will give rise to an irreparable lack of levelness and reduced respect of geometric tolerances, in particular with reference to the outer surface of the molding element. These consequences are clearly unacceptable from an aesthetic point of view.

In an attempt to solve the mentioned drawbacks, a third typology of molding elements has been recently widespread, in which the molding element has a longitudinal housing intended for receiving, by snap-fitting, a plurality of coupling elements which are positioned in the longitudinal housing at locations spaced apart the same distance from each other.

More specifically, the molding element comprises an elongated main body, to be obtained by extrusion or molding, in which the longitudinal housing is defined. Said housing, on the molding element side to be turned to the car body, has an opening or slit from which the coupling element can partly emerge. In more detail, at the opening or slit, millings or cuttings are formed at regular intervals so as to enable insertion of each of the coupling elements while at the same time defining axial locating surfaces into which the coupling elements are snap-locked.

The different coupling elements, once they have been suitably linked to each other, will each have at least one projection emerging in a direction substantially perpendicular to the longitudinal housing in order to engage corresponding slots formed in the car body.

Although the last mentioned construction of known type is surely valid as regards anchoring and operating reliability, it has shown important drawbacks too.

In particular, since millings are to be executed at the longitudinal housing for access of the coupling elements, an additional working step is clearly involved which will bring about additional production costs. Furthermore, since the main body in which milling is carried out is typically made of a material having good mechanical features, and sometimes is even made of two materials, milling operations are not easy.

It is also to note that milling or cutting operations give rise to an important weakening in the structure forming the molding element, thereby inevitably involving deformations and in particular surely unaesthetical undulations that reduce levelness and observance of the geometrical tolerances in the outer surface of the molding element. Furthermore, due to the great rigidity of the section member and the presence in many cases of metal cores, problems may arise in carrying out maintenance of the abrasive elements for executing the milling operations, which will result in high working costs and product waste.

In addition, the residual presence of possible burrs can cause abrasions and scratches on the painted portions of the car body.

SUMMARY OF THE INVENTION

Under this situation, it is a fundamental object of the present invention to provide a new process capable of preparing a molding element for car bodies that, in addition to affording high performance in terms of strength and reliability in time as regards anchoring to the body. This provides an inexpensive process without on the other hand involving an important increase in material consumption.

We provide a process for preparing a molding element for motorcar bodies by the steps of manufacturing a main body of elongated conformation that has a longitudinal housing provided with a fitting opening and at least one of its ends. The longitudinal housing, seen in transverse cross section, is provided with a longitudinal opening extending substantially over the whole length of the moulding element and at least one undercut. We provide attachment means that has a continuous support element rigidly carrying a number of projections disposed at a predetermined distance from a each other. We couple the continuous support element to the main body by inserting the support element through the fitting opening and by sliding the support element in the housing until it reaches the desired axial positioning and then we axially fasten the continuous support element to the main body once the support element is conveniently positioned relative to the main body itself. This provides a molding element which is adapted for engagement to slots or housings formed on an anchoring region of a car body.

Other advantages of the invention will become more apparent upon reading the following preferred description taken in conjunction with the drawings.

BRIEF DESCRIPTION OF THE DRAWINGS

FIG. 3 is a fragmentary longitudinal view in which attachment means for engagement of the molding element in accordance with the invention with a car body is highlighted; and FIG. 4 is a plan view from top of the attachment means shown in FIG. 3.

DESCRIPTION OF THE PREFERRED EMBODIMENTS

Figure 2:
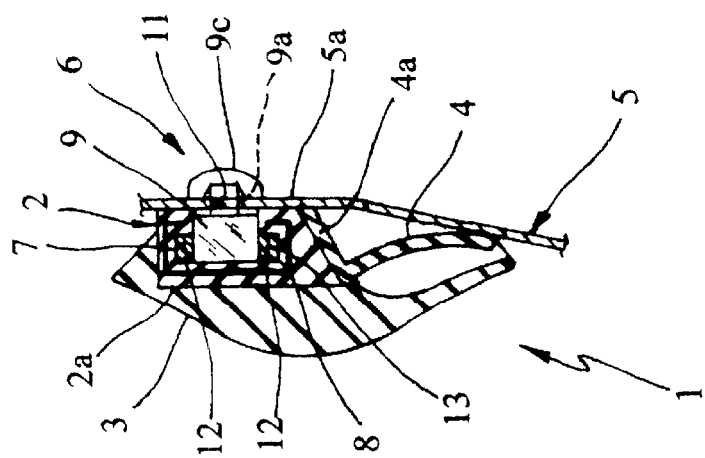
FIG. 2 is a cross-sectional view taken along line II—II in FIG. 1 showing the molding element of FIG. 1 when engaged to a car body.
Figure 1:
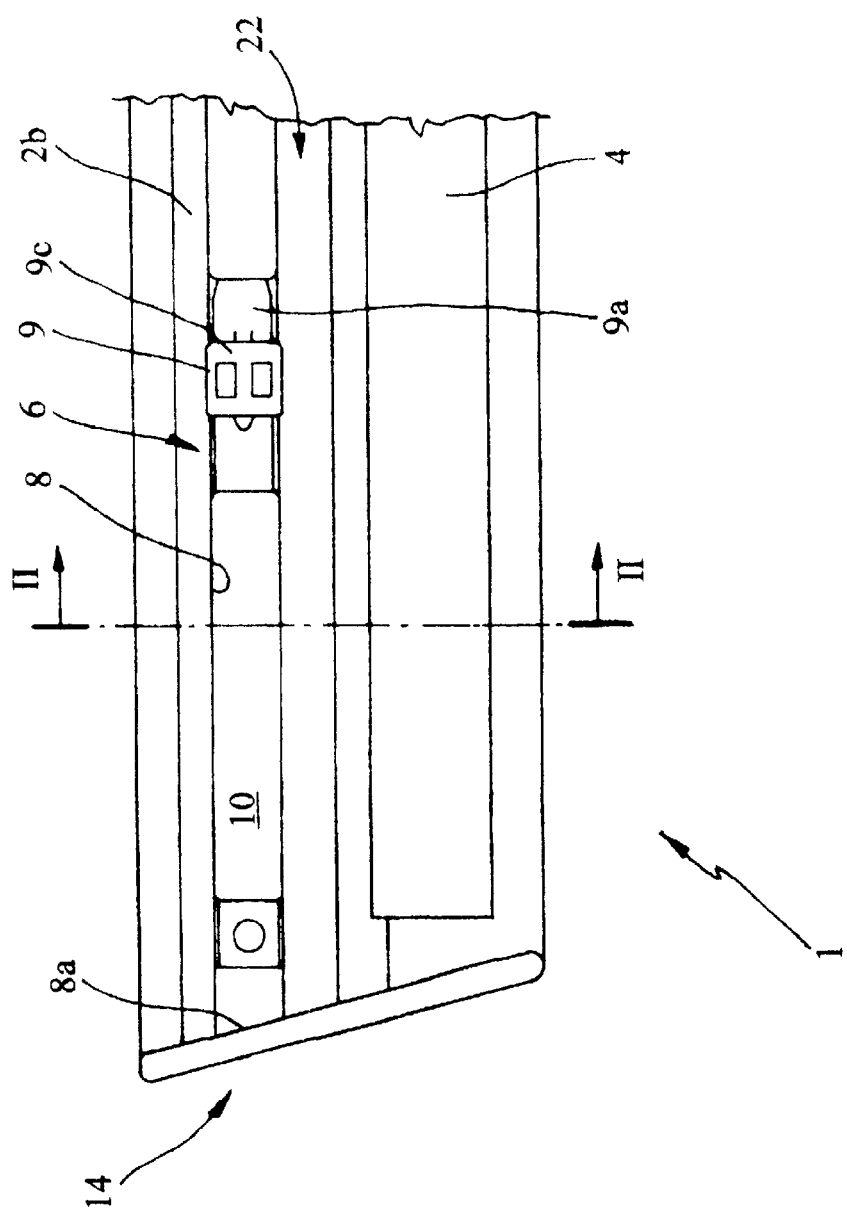
FIG. 1 is a fragmentary plan view relating to a coupling side of a molding element obtained by means of a process in accordance with the present invention.

With reference to the drawings and in particular to FIGS. 1 and 2, a molding element for body cars has been generally identified by reference numeral 1.

As already mentioned, the molding element 1 can be employed as a protection element, aesthetic surface finish or covering element at various regions of a car body, on the sides of the body at the lower edge thereof for example, at the front and rear bumpers, on doors, and so on.

The molding element 1 is comprised of a main body 2 optionally provided with a metal core of an elongated conformation and to be obtained by extrusion, molding, or other operations, for example.

The main body has an outer side 2a with which a surface-finish covering 3 is associated; since this covering is to be rigidly coupled with the main body, preferably it can be joined thereto by injection molding techniques or coextrusion with the main body. Preferably, although not necessarily, the main body may also be provided with a flexible sealing lip 4 substantially extending over the whole longitudinal extension of the molding element 1 and having a base portion 4a rigidly engaged with the main body 2. From a construction point of view, coupling between the main body 2 and sealing lip 4 can be obtained by several different techniques, by coextrusion of them for example, carried out continuously.

In order to achieve engagement of the main body 2, hence the molding element 1, with a corresponding anchoring region 5a formed on the car body 5, attachment means 6 is provided which is operatively associated with the main body at an inner side 2b of said main body opposite to said outer side 2a.

In an original manner, the attachment means comprises a continuous support element 7 substantially extending over the whole longitudinal extension of the main body 2 and linked to the latter preferably by fitting in a corresponding longitudinal housing 8 formed in the inner side 2b of the main body 2.

The continuous support element 7 is arranged to carry a predetermined number of attachment projections 9 that are rigidly fixed and placed at a given distance from each other. In other words, the continuous support element 7 practically constitutes a rigid connecting element between the different attachment projections 9 so that said projections are joined together in a predetermined number, conveniently spaced apart by a preestablished pitch and in mutual alignment relationship.

In more detail, it is to note that the longitudinal housing 8 formed in the main body 2, seen in transverse section has a longitudinal opening 10, also extending substantially over the whole length of the molding element, arranged to enable said projections 9 to emerge at least partly from the longitudinal housing in order to engage, as mentioned, slots 11 formed in the car body. Still referring to the transverse section, the longitudinal housing 8 has at least one undercut 12 arranged to act and abut against a corresponding abutment portion 13 of the continuous support element 7 to prevent it from being drawn out through the longitudinal opening. It is to note that, in the embodiment shown, two undercuts 12 are preferably provided, for symmetry purposes, and they cooperate with respective abutment portions 13. Practically, both the continuous support element 7 and the longitudinal housing 8 have a transverse bulkiness greater than that of the longitudinal opening 10 at least at predetermined lengths thereof, so that the continuous support element 7 may be received in the housing 8 without being drawn out therefrom through the longitudinal opening 10.

Actually, in order to enable coupling of the attachment means 6 with the main body 2 during the assembling step, the longitudinal housing 8 is provided to have, at at least one of its ends, a fitting opening 8a to receive the continuous support element 7 which may pass through the fitting opening itself and may be caused to slide in the housing 8 until it reaches the desired axial positioning.

Once the attachment means 6 is conveniently positioned relative to the main body 2, the continuous element is axially fastened by use of axial lock means 14 operatively interposed between the main body and the continuous support element.

More specifically, this axial lock means may be conventional locking members of the screw-threaded type for example or, as in the embodiment shown in FIG. 4, a slot 15 having a dovetail-shaped undercut for example, adapted to receive a corresponding portion integral with the main body. It is to note that in the embodiment shown the finish covering 3, once rigidly associated with the main body 2, will have a portion adapted to be inserted in the axial-lock slot 15 formed in the continuous support element 7, so as to retain said element in the axial direction.

Referring now to the particular structure of the attachment means 6, it is to note that projections 9 can be of one piece construction with or, alternatively, inserted by snap-fitting, threaded or interference fitting, in the continuous support element which preferably has lightening reliefs 16 disposed at regular intervals between consecutive projections 9.

These reliefs can be particularly useful for fastening of support 2 within an injection mould where finish covering 3 is carried out.

It is obvious that in any case the continuous support element can be also formed of a small base or strip devoid of reliefs without, on the other hand, necessarily losing its operational character.

As particularly shown in FIGS. 2, 3 and 4, each of the attachment projections 9 comprises a portion 9a for connection with the continuous support element 7, a connecting neck 9b emerging from said connecting portion 9a away from the continuous support element 7 and adapted, under operating conditions, to pass through the longitudinal opening 10 and possibly the slot on the car body 5, and a head 9c, placed at the end of said connecting neck 9b and having a transverse section of swollen conformation relative to the connecting neck. It is to note that the head of each projection is practically the portion intended for engagement of the corresponding housings or slots 11 formed in the anchoring region 5a of the car body 5 (see FIG. 2).

Finally, from the point of view of materials, it is to note that the continuous support element 7 and projections 9 can be made, by molding for example, of:

polyoxymethylene;

acetal resins;
reinforced polyamides;
thermoplastic or thermosetting materials possibly reinforced with fibers of various nature adapted for the purpose;
metal alloys.

In turn, the main body 2 and covering 3 can be respectively made of:
extruded PVC compounds with a metal or fiber core, or any other thermoplastic or thermosetting material or vulcanized rubbers adapted to the purpose, reinforced or not with fibers or metal cores,
and of:
PVC compounds of the soft type for example, so as to better absorb possible shocks, or any other thermoplastic or thermosetting material or vulcanized rubbers adapted to the purpose.

The invention achieves important advantages.

It is first to note that the molding element in accordance with the present invention substantially solves all drawbacks typical of the embodiments of known type, while ensuring an efficient anchoring, high operating reliability and reduced costs, as regards both production of the different elements forming it and assembling of them.

It should be in particular recognized that all milling and/or cutting operations necessary for a correct fastening of the attachment means 6 to the main body 2 are substantially eliminated.

In addition, due to the particular conformation of the continuous element 7 integrally carrying a plurality of attachment projections, positioning of all projections can be carried out by a single operation, thereby greatly saving time in assembling.

In addition to enabling time to be saved in construction and assembling, the molding element 1 in reference is also very valid because problems of structural weakening are substantially eliminated due to the absence of material-removal operations and, above all, occurrence of permanent deformations or undulations on the substantially finished workpiece is completely excluded.

In conclusion, therefore, the molding element in accordance with the invention can be produced at reduced costs although it reaches qualitative results hardly achievable and only at prohibitive costs with known systems, as regards both observance of geometrical tolerances and mechanical strength.

It will, of course, be appreciated that the embodiments which have just been described have been given by way of illustration, and the invention is not limited to the precise embodiments described herein. Various changes and modifications may be effected by one skilled in the art at without departing from the scope or spirit of the invention as defined in the appended claims.

What is claimed is:

1. A process for preparing a molding element for motorcar bodies comprising the following steps:
   manufacturing a main body (2) of elongated conformation presenting a longitudinal housing (8) provided with a fitting opening (8a) at at least one of its ends, the longitudinal housing (8), seen in transverse cross section, having a longitudinal opening (10) extending substantially over the whole length of the molding element and at least one undercut (12);
   manufacturing attachment means (6) comprising a continuous support element (7) rigidly carrying a number of projections (9) disposed at a predetermined distance from a each other;
   coupling the continuous support element (7) to the main body (2) by inserting the support element through the fitting opening (8a) and by sliding said support element in the housing until it reaches the desired axial positioning; and then
   axially fastening the continuous support element (7) to the main body (2) once said support element is conveniently positioned relative to the main body itself, thereby obtaining a molding element which is adapted for engagement to slots or housings (11) formed on an anchoring region of a car body (5).

2. A process according to claim 1, wherein the main body (2) is manufactured by extrusion.

3. A process according to claim 1, wherein the main body (2) is manufactured by molding.

4. A process according to claim 1, wherein the main body (2) is provided with a metal core of an elongated conformation.

5. A process according to claim 1, wherein the further step of coupling the main body (2) with a sealing lip (4).

6. A process according to claim 5, wherein the sealing lip (4) is coupled with the main body (2) by coextrusion carried out continuously.

7. A process according to claim 1, wherein the step of joining a finish covering (3) to the main body.

8. A process according to claim 7, wherein the finish covering (3) is joined to the main body by injection molding.

9. A process according to claim 8, wherein the finish covering (3) joined to the main body (2) by injection molding presents a portion adapted to be inserted in an axial-lock slot (15) formed in the continuous support element (7) so as to achieve the axial fastening of the continuous support element (8) to the main body (2).

10. A process according to claim 7, wherein the finish covering (3) is joined to the main body by coextrusion.

11. A process according to claim 1, wherein said axial fastening of the continuous support element (7) to the main body (2) is obtained by screw locking of the continuous support element to the main body itself.

12. A process according to claim 1, wherein said axial fastening of the continuous support element (7) to the main body (2) is obtained by injection molding of a finish covering (3) on the main body (2), the injecting finish covering (3) presenting at least a portion adapted to be inserted in an axial-lock slot (15) of the continuous support element.

13. A process according to claim 12, wherein each of said attachment projections (9) comprises a portion (9a) for connection with the continuous support element, a connecting neck (9b) emerging from said connecting portion and intented, under opening conditions, for passing through said longitudinal opening (10), and a head (9c) placed at the end of said connecting neck and having, in cross section, a swollen conformation relative to said neck, said head being arranged to the engage corresponding housings or slots (11) formed in an anchoring region (5a) of the car body (5) to which the molding element is to be associated with.

14. A process according to claim 1, wherein said continuous support element (7) extends substantially over the whole length of the main body.

15. A process according to claim 1, wherein the projections (9) are spaced apart by a pre-established pitch in mutual alignment relationship.

16. A process according to claim 1, wherein once the support element (7) has been completely inserted inside the housing (8), said projections (9) emerge at least partly from said longitudinal housing (8) through said longitudinal opening (10).

17. A process according to claim 16, wherein once the support element (7) has been completely inserted inside the housing (8), a longitudinal undercut (12) of the housing abuts against a corresponding abutment portion (13) of the continuous support element (7) to prevent said projections (9) from being drawn out through said longitudinal opening (10).

18. A process according to the claim 1, wherein said attachment projections are of one piece construction with the continuous support element (7).

19. A process according to claim 1, wherein the continuous support element is provided with lightening reliefs (16) disposed at regular intervals between the consecutive projection (9).

20. A process for preparing a molding element for motorcar bodies comprising the following steps:

manufacturing a main body (2) of elongated conformation presenting a longitudinal housing (8) provided with a fitting opening (8a) at at least one of its ends, the longitudinal housing (8), seen in transverse cross section, having a longitudinal opening (10) extending substantially over the whole length of the molding element and at least one undercut (12);

manufacturing attachment means (6) comprising a continuous support element (7) rigidly carrying a number of projections (9) disposed at a predetermined distance from a each other, said continuous support substantially extending over the whole longitudinal extension of the main body;

inserting the support element through the fitting opening (8a);

sliding the inserted support element along the longitudinal housing until it reaches the desired axial positioning relative to the main body;

axially fastening the continuous support element (7) to the main body (2) thus obtaining a finished molding element; and then mounting the molding element onto the motorcar body.

21. A process for preparing a molding element for motorcar bodies comprising the following steps:

extruding a main body (2) provided with an inner side (2b) which defines a longitudinal housing (8) presenting, in transverse section, two undercuts (12), the two undercuts delimiting a longitudinal opening (10) extending substantially over the whole length of the molding element;

manufacturing a continuous support body (7) extending along the whole length of the main body and rigidly carrying a plurality of attachment projections (9);

inserting the support element through a fitting opening (8a);

sliding the inserted support element along the longitudinal housing until it reaches the desired axial positioning relative to the main body, each of said projections having a head (9c) emerging outside of said housing (8);

joining a finish covering (3) to the main body (2) by injection molding, the injected finish covering also presenting a portion inserted in an axial-lock slot formed in the continuous support element thereby axially locking the main body and the continuous support element;

fixing the molding element to the car body by engaging each head (9c) into the corresponding housing (11) formed in an anchoring region (5a) of the car body.

* * * * *